United States Patent [19]

Ahlberg et al.

[11] Patent Number: 5,073,262
[45] Date of Patent: Dec. 17, 1991

[54] MULTI-PURPOSE ROTATING MEMBRANE FILTER

[76] Inventors: Walter F. Ahlberg, 7512 Burgoyne, #312, Houston, Tex. 77063; Joseph F. Long, 1335 Lost Creek Blvd., Austin, Tex. 78746

[21] Appl. No.: 480,680

[22] Filed: Feb. 14, 1990

Related U.S. Application Data

[63] Continuation-in-part of Ser. No. 338,098, Apr. 14, 1989, Pat. No. 4,925,557.

[51] Int. Cl.⁵ .............................................. B01D 61/18
[52] U.S. Cl. ........................... 210/321.68; 210/333.01; 210/456
[58] Field of Search ................. 210/321.68, 456, 412, 210/333.01, 331

[56] References Cited

U.S. PATENT DOCUMENTS

| | | | |
|---|---|---|---|
| 3,653,513 | 4/1972 | Ortega et al. | 210/472 X |
| 4,500,435 | 2/1985 | Muller | 210/333.01 X |
| 4,626,351 | 12/1986 | Fuhring | 210/331 |
| 4,925,557 | 5/1990 | Ahlberg et al. | 210/321.68 |

FOREIGN PATENT DOCUMENTS 197801 1/1978 U.S.S.R. ................... 210/321.68

*Primary Examiner*—Frank Spear
*Attorney, Agent, or Firm*—Joseph F. Long

[57] ABSTRACT

A Multi-Purpose Rotating filter comprising a multiplicity of controlled pore sized membrane covered hollow double cone shaped filter discs mounted on a rotatable hollow shaft with provisions for feed between the rotating discs and disc speed sufficient to create a boundary layer to keep the disc surfaces essentially clean as disclosed.

6 Claims, 2 Drawing Sheets

MULTI-PURPOSE ROTATING MEMBRANE FILTER

BACKGROUND OF THE INVENTION

This is a continuation-in-part of Ser. No. 07/338,098 filed 4/14/89, entitled A Multi-purpose Rotating Membrane Filter now U.S. Pat. No. 4,925,557.

Continued development has led to improved filter discs for use in a rotating filter and improved feed manifold. There continues to be a need for a rotating continuous filter that will filter out particles as small as 0.45 microns as well as a filter that will separate all the oil from water. The present invention covers use of a rotating, hollow disc filter in which the disc is covered with a membrane containing controlled pore size openings that may be effectively less than 0.4 microns

SUMMARY OF THE INVENTION

The invention encompasses multiple rotatable hollow membrane covered filter discs mounted on a rotatable shaft in such a manner that the filtrate is drawn off from the center of the shaft and solids or sludge may be drawn off from the bottom of the unit with less dense fluids such as oil being drawn off from the top of the unit. The flow rate thru a unit varies with pore size of the membrane on the filter disc, total membrane filtration area, inlet and exit pressure differential, type of material being filtered, cleanliness of the disc surface and speed of movement of the membrane surface thru the liquid.

The invention may be described a follows:

a. a compartmented cylindrical body containing a hollow rotatable shaft. The diameter of the rotating shaft is such as to have 10 ft./sec. or greater velocity across the hollow filter disc adjacent to the shaft at expected operating speeds. Openings in the shaft communicate with the central chamber of hollow membrane covered filter discs mounted on the shaft with sealing rings to allow only liquid (filtrate) that comes thru the filters to enter the shaft; the membrane covering may be a sintered metal membrane alone, a sintered metal membrane covered with an adhering controlled pore size plastic membrane, a perforated plate covered with stainless steel screen which is then covered with a controlled pore size plastic membrane, a totally plastic structure or other structures that form an open disc to allow filtrate to flow to a central hollow shaft when the disc is covered with a metal or plastic membrane with controlled pore size openings.

b. a draw-off chamber with proper seals to allow draw off of material from the rotating hollow shaft, c. A draw-off from the top of the cylindrical body to draw-off lighter liquid such as oil that tends to travel toward the rotating shaft and travel upward thru vent pipes in the disc or thru the hub of each hollow membrane covered filter disc to the top of the vessel, d. a sludge or solids draw-off from the bottom section of the compartmented cylindrical body, e. a feed inlet manifold with a multiplicity of take off's thru the wall of the top compartment of the compartmented cylindrical vessel to jet feed into the liquid in the filter at intervals as close as between each pair of the hollow membrane-covered filter discs, or individual feed lines with an open end near the rotating shaft.

f. means to measure the total feed to the unit and means such as a centrifugal pump to maintain feed pressure from less than 5 psi to above 100 psi, g. automatic valving and pressure means to allow flushing the filtrate from the unit backwards thru the hollow shaft and thru the controlled pore size membrane of the filter discs. During this operation feed flow would be stopped and either the sludge draw off would be opened or alternatively means to direct the liquid from the filter unit to the feed tank could be used.

The details of a preferred embodiment of the total unit including the hollow membrane-covered filter disc and necessary seals around the rotating hollow shaft will become clear from the attached drawings and explanation thereof.

Minor changes may easily be made by one of normal skill in the mechanical arts and we mean only to be limited to the general design and spirit and purpose as outlined in these claims and specifications.

DESCRIPTION OF PREFERRED EMBODIMENTS

Figure 1:
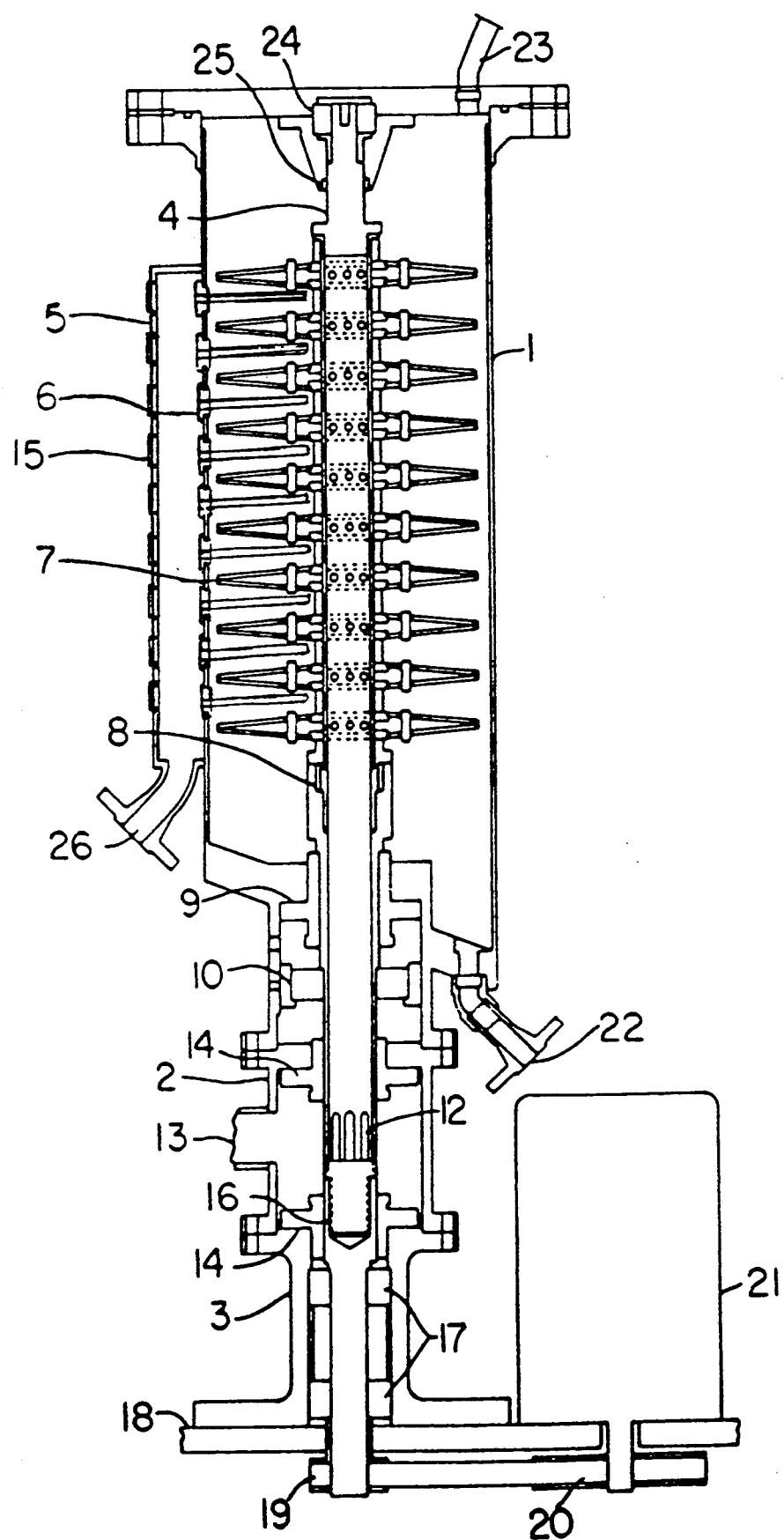
FIG. 1 shows the assembled unit with feed inlet manifold and with hub size of the disc and total disc size in relatively correct proportions.

In FIG. 1 we show the assembled unit comprising:

a. an upper body segment 1 containing the hollow rotary shaft 4 with inlet feed manifold 5, with a multiplicity of feed lines 6 and installation ports 15, that with the usual 5-100 psi feed pressure, jet feed between each pair of hollow membrane covered filter discs 7. The hollow rotary shaft 4 has a spline type disconnect 8 to allow easy removal and installation of the hollow rotary shaft 4 with the multiplicity of hollow membrane covered filter discs 7 mounted thereon. In this top segment we also have a double fluid seal 9 and an adjustable thrust bearing 10. Sludge draw-off is thru opening 22 while oil or fluids lighter than water may be drawn off thru outlet 23. A clean out draw-off 26 may be used to return feed or back flushed liquid to the feed tank. We show O-ring seals 25 to protect the upper shaft bearing 24. Note that other types of feed manifolds to feed at multiple points would be acceptable.

b. an intermediate body segment 2 contains double fluid seals 14 and the lower end of hollow rotary shaft 4 with openings 12 to allow filtrate to exit the unit thru filtrate discharge 13. A driver spline connection 16 drives the hollow rotary shaft 4 thru a drive shaft connected with drive gear 19. The drive shaft goes thru lower body segment 3 which also holds dual bearings 17 for the drive shaft which is connected to drive gear 19. Drive gear 19 is, in one embodiment, driven by motor drive gear 20 mounted on a drive shaft of motor 21. Belt drive, chain drive, or direct gear drives could all be used, c. the total unit is mounted on baseplate 18, the rotary drive shaft 4 may be belt or gear driven by a power source which could be a motor or a motive source driven by steam, electricity or fossil fuel.

FIGS. 2, 3, 4, and 5, show details of a preferred embodiment hollow membrane-covered filter disc 7.

Figure 2:
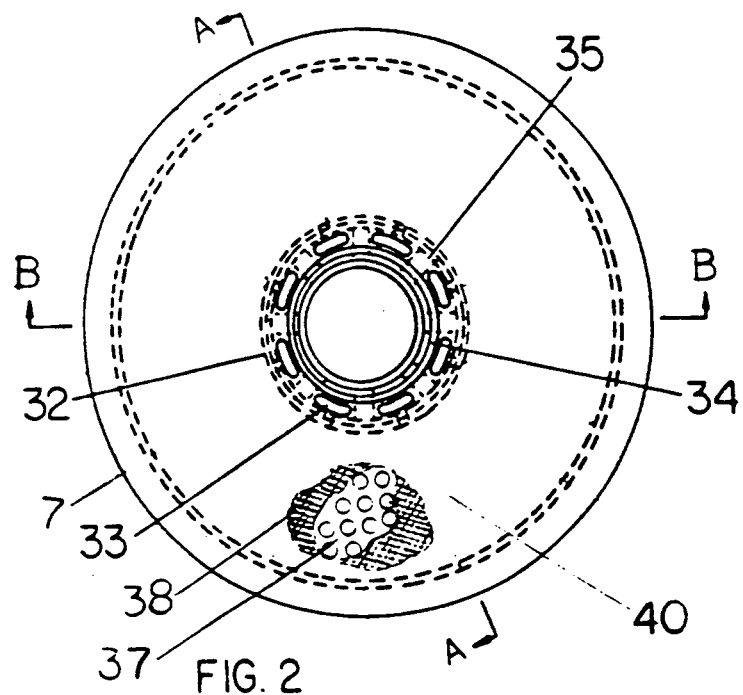
FIG. 2 shows a top view of the disc indicating vent pipes thru the hub and relative size of hub and disc and showing underlaying perforated metal plate covered with wire mesh, which is then covered with controlled pore size plastic.

In FIG. 2 we show a top view of the hollow membrane covered filter disc 7. The hub 32 is large enough to have a shear velocity at the outer portions of the hub 32 of a minimum of 10 ft./sec. when the hollow rotatable mounting shaft 4 is rotated at 500 to 1500 rpm. with 10 ft./sec. speed at one point on the hub 32 there is a very thin static layer on the disc 7 as it rotates. The shear layer above this static layer tends to keep solids from plugging the filter membrane. Rotating speed and size are interrelated to allow the surface of the membrane to move a minimum of 10 ft./sec. with a velocity of above 30 t./sec. being a normal or expected speed.

A multiplicity of vertical vent pipes or openings 33 in the peripheral part of hub 32 allow less dense fluids such as oil to travel upward toward the upper discharge nozzle 23, FIG. 1 with these vent pipes 33 also allowing lighter flocculent solids to move upward to prevent covering of the disc 7 with solids.

A multiplicity of horizontal openings 35 allow movement of filtrate from the interior of discs 7 to an open collector ring 34 that allows filtrate to move thru holes or openings at this point in shaft 4, FIG. 1, to the center portion of shaft 4 and down thru outlet holes 12, FIG. 1 to the filtrate exit 13.

The layers making up this embodiment are shown with the outer layer of the disc 7 being a controlled pore size fluorocarbon resin 40. Note that other resins could be used or a controlled pore size sintered metal membrane could be used. As shown the controlled pore size fluorocarbon resin 40 is fused to a forty mesh stainless screen 38. In one preferred embodiment two layers of forty mesh screen are used to allow the flurocarbon to be more securely locked in. The forty mesh screen is supported on a perforated metal plate 37 forming the upper half and lower half of the disc. In smaller sizes the perforated metal plate 37 has sufficient strength so that no internal support structure is needed. In larger sizes of discs perforated triangular support struts could be welded to the hub 4 to support the perforated metal plate 37.

Figure 3:
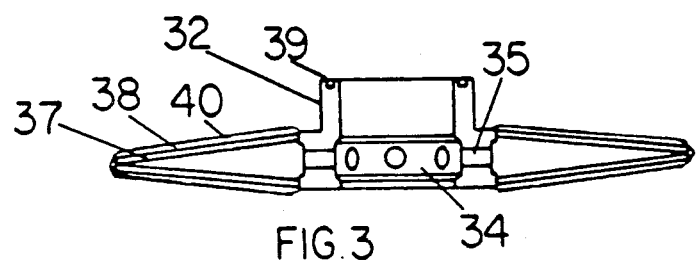
FIG. 3 shows a section A—A of the disc in FIG. 1 indicating the openings thru the hub leading to openings in the hollow mounting shaft thereby allowing the open interior of the disc to communicate with the hollow mounting shaft interior.

FIG. 3 shows a section A—A to further elucidate the structure of disc 7, FIG. 2.

A section view A—A in this preferred embodiment shows two of a multiplicity of openings 35 that lead from the internal portions of disc 7, FIG. 2 to the interior of collector ring 34 which in turn allows filtrate flow into the hollow shaft 4, FIG. 1.

The perforated metal plate 37 is welded to the hub 4, FIG. 1 and, at the peripheral edge, to itself. One or more layers of approximately forty mesh stainless screen is welded to the perforated metal on each side of disc 7. A controlled pore size fluorocarbon membrane 40 may be fused to the surface and outer edge of the forty mesh screen wire 38. Stainless screen of other mesh sizes should also be acceptable and could be useable without the perforated back up plate.

An O-ring seal 39 between each disc hub 32, FIG. 2 as it is positioned on shaft 4, FIG. 1 prevents leakage of unfiltered material into the hollow shaft 4.

Figure 4:
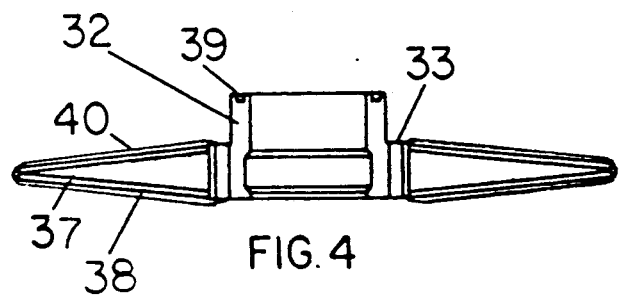
FIG. 4 shows section B—B of disc in FIG. 1 indicating open structure and vertical vent pipes thru the hub to allow a lighter fluid such as oil to flow to an upper liquid draw off point.

FIG. 4, section B—B of FIG. 2, is showing two of a multiplicity of vertical vent openings or pipes 33 thru each hub 32 and also showing hollow structure of the disc 7 so that filtrate in the disc 7 interior moves freely.

Figure 5:
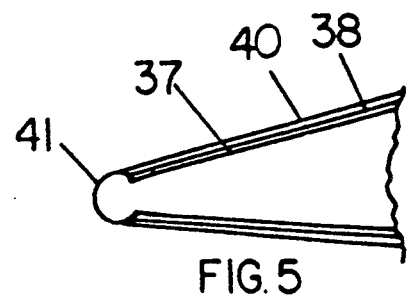
FIG. 5 shows an edge view of the disc wherein the perforated metal plate and wire mesh covering is welded to an open bead ring that may act as an expansion joint.

FIG. 5 shows an end section of another embodiment of the outer peripheral edge of disc 7, wherein the perforated metal plate 37 is welded to an open bead expansion joint 41. The porous controlled pore size plastic membrane 40 is fused to the metal screen 38 which also may be welded to the perforated metal plate 37. The drawing shows the layers 37, 38, and 40 separated for clarity.

Although we have described a preferred embodiment of the hollow disc several other embodiments may be equally effective. Discs made as follows will be considered:

1. a sintered polyimide disc formed with a honeycomb support structure inside the disc with the polyimide having a controlled pore size opening;

2. discs made as in 1 above wherein the polyimide layer is supported on a heavy metal screen welded to a peripheral semi-circular expansion edge;

3. discs made as in 1 above wherein the polyimide is supported on stainless perforated support plate and wherein the perforated support plate is curved slightly upward to improve strength and better distribute stresses;

4. discs made of similar shape as shown wherein a controlled pore size plastic sheet (any of several plastics may be used) is clamped or fused at the edges to a perforated stainless support plate or screen.

Work is continuing to achieve most in-use cost effective disc design with integrity of the disc and in-use life being of major importance. We do not wish to be limited to exact details but only to the general spirit and purpose as outlined in these claims and specifications.

| Legend - Drawings | |
|---|---|
| No's | Description |
| FIG. 1 | |
| 1 | Filter body - feed segment |
| 2 | Filter body - draw off segment |
| 3 | Filter body - lower bearing & support segments |
| 4 | Hollow rotatable mounting shaft |
| 5 | Inlet manifold |
| 6 | One of multiple feed lines to feed between discs |
| 7 | One of multiple rotating membrane-covered hollow filter discs |
| 8 | Spline to allow removal of upper section of the rotatable hollow mounting shaft 4 |
| 9 | Double fluid seal |
| 10 | Adjustable trust bearing |
| 12 | Discharge openings from center of shaft 4 |
| 13 | Filtrate effluent |
| 14 | Double seals |
| 15 | Feedline installation ports |
| 16 | Spline drive joint |
| 17 | Bottom shaft bearing |
| 18 | Base plate |
| 19 | Shaft drive wheel |
| 20 | Drive gear |
| 21 | Drive motor |
| 22 | Sludge draw off |
| 23 | Oil draw off |
| 24 | Top bearing |
| 25 | O-ring seals |
| FIG. 2 | |

-continued

| No's | Legend - Drawings<br>Description |
|---|---|
| 30 | Hollow membrane-covered filter disc |
| 32 | Hub |
| 33 | One of multiple vent pipes |
| 34 | Collector ring of open interior hub 32 |
| 35 | One of multiple openings connecting interior of filter disc 30 with open interior 34 of hub 32 |
| FIG.3 | |
| 31 | Inner support strut |
| 32 | Hub |
| 35 | Connecting openings between disc 30 interior and hub interior 34 |
| 37 | Perforated metal plate - may be 1/8" openings |
| 38 | 40 mesh metal screen - may be one or two layers |
| 39 | O ring seal between hubs 32 |
| 40 | Controlled pore size plastic membrane covering fused to metal mesh 38 |
| FIG. 4 Shows section B—B of FIG. 2 | |
| 33 | Vent pipes thru hub 32 |
| 39 | O ring seal between hubs 32 |
| FIG. 5 | |
| 41 | An open bead expansion joint edge used in one embodiment of disc 3 |
| 37 | Perforated metal plate |
| 38 | 40 mesh metal screen |
| 40 | Controlled pore size plastic membrane covering fused to metal mesh 38 |

What is claimed is:

1. A Multi-Purpose Rotating Membrane Filter Unit comprising:
   a) a rigidly mounted cylindrical body;
   b) a rotatable hollow shaft means in said rigidly mounted cylindrical body;
   c) a plurality of controlled pore size membrane-covered hollow disc means mounted on said rotatable hollow shaft means with openings in said rotatable hollow shaft means communicating with an interior of said controlled pore size membrane-covered hollow disc means; said disc means comprising:
      1) two doughnut shaped flat perforated metal plates with each of said perforated metal plates welded to a doughnut shaped hub on an interior periphery and welded together at an outer periphery to form an open interior double truncated cone shaped disc;
      2) a minimum of one metal screen covering fastened to each exterior side of said doughnut shaped perforated metal plates and said hub;
      3) a controlled pore size plastic membrane covering adhering to each exterior side of said metal screen covering;
      4) a minimum of one metal pipe extending vertically through said hub to allow upward liquid flow and openings in said hub to communicate with an interior of said rotatable hollow shaft;
   d) a first draw-off means in said rigidly mounted cylindrical body whereby material may be continuously removed from the upper part of said rigidly mounted cylindrical body;
   e) a second draw-off means in said rigidly mounted cylindrical body whereby material may be removed from a lower part of said rigidly mounted cylindrical body;
   f) a third draw-off means in said rigidly mounted cylindrical body whereby filtrate may be continuously removed from the interior of said rotatable hollow shaft means;
   g) a back pulse pump means connected with said third draw-off means where in said filtrate may be periodically pressured to backflow through said controlled pore size membrane-covered hollow disc means,
   h) a feed manifold means mounted on said rigidly mounted cylindrical body with exit openings from said feed manifold means providing an inlet feed between each pair of said plurality of controlled pore size membrane-covered hollow disc means.

2. A Multi-Purpose Rotating Membrane Filter Unit as in claim 1 wherein said exit openings form said feed manifold means are closed with individual feed pipes to inject said inlet feed between said each pair of said plurality of controlled pore size membrane-covered hollow disc means adjacent to said rotatable hollow shaft means.

3. A Multi-Purpose Rotating Membrane Filter Unit comprising:
   a) a closed cylindrical body;
   b) a rotatable hollow shaft in said closed cylindrical body;
   c) a multiplicity of hollow disc means mounted on said rotatable hollow shaft; said hollow disc means each comprising:
      1) two doughnut shaped flat perforated metal plates with each of said perforated metal plates welded to a doughnut shaped hub on an interior periphery and welded together at an outer periphery to form an open interior double truncated cone shaped disc;
      2) a minimum of one metal screen covering fastened to each exterior side of said doughnut shaped perforated metal plates and said hub;
      3) a controlled pore size plastic membrane covering adhering to each exterior side of said metal screen covering;
      4) a minimum of one metal pipe extending vertically through said hub to allow upward liquid flow and openings in said hub to communicate with an interior of said rotatable hollow shaft;
   d) a feed manifold means to allow feed to enter between each of said multiplicity of hollow disc means adjacent to said rotatable hollow shaft;
   e) means whereby materials may be withdrawn through an upper head of said cylindrical body;
   f) means whereby material may be withdrawn from the interior of said rotatable hollow shaft and means whereby material may be withdrawn through a bottom head of said closed cylindrical body;
   g) an adjustable speed drive means to drive said rotatable hollow shaft.

4. A Multi-Purpose Rotating Membrane Filter Unit as in claim 3 wherein said hub of said membrane-covered hollow disc means has a minimum diameter that is one-fourth of said membrane covered hollow disc means diameter.

5. A Multi-Purpose Rotating Membrane Filter Unit as in claim 3 wherein said outer periphery of each of said doughnut shaped perforated metal plates is welded to a circumferential open expansion bead.

6. A Multi-Purpose Rotary Membrane Filter Unit as in claim 3 further comprising valving, back pulse piping and pump means to pump a portion of said material withdrawn from the interior of said rotatable hollow shaft back through said membrane covered hollow disc means.

* * * * *